US011388175B2

(12) United States Patent
Pularikkal et al.

(10) Patent No.: US 11,388,175 B2
(45) Date of Patent: Jul. 12, 2022

(54) THREAT DETECTION OF APPLICATION TRAFFIC FLOWS

(71) Applicant: Cisco Technology, Inc., San Jose, CA (US)

(72) Inventors: Gangadharan Byju Pularikkal, San Jose, CA (US); Santosh Ramrao Patil, Santa Clara, CA (US); Paul Wayne Bigbee, Palo Alto, CA (US); Darrin Joseph Miller, Marysville, OH (US); Madhusudan Nanjanagud, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

(21) Appl. No.: 16/562,017

(22) Filed: Sep. 5, 2019

(65) Prior Publication Data
US 2021/0075799 A1   Mar. 11, 2021

(51) Int. Cl.
*H04L 9/40* (2022.01)
*G06N 20/00* (2019.01)
*G06K 9/62* (2022.01)
*H04L 45/00* (2022.01)

(52) U.S. Cl.
CPC ........ *H04L 63/1408* (2013.01); *G06K 9/6267* (2013.01); *G06N 20/00* (2019.01); *H04L 45/38* (2013.01); *H04L 63/102* (2013.01); *H04L 63/105* (2013.01); *H04L 63/20* (2013.01)

(58) Field of Classification Search
CPC . H04L 63/1408; H04L 63/102; H04L 63/105; H04L 63/20; H04L 45/38; G06N 20/00; G06K 9/6267

USPC .......................................... 709/224
See application file for complete search history.

(56) References Cited

U.S. PATENT DOCUMENTS

| 7,797,406 | B2 * | 9/2010 | Patel ................... H04L 41/5022 709/220 |
| 7,827,256 | B2 * | 11/2010 | Phillips .................. H04L 67/02 709/220 |
| 8,555,388 | B1 * | 10/2013 | Wang ....................... H04L 69/22 713/188 |
| 8,589,541 | B2 * | 11/2013 | Raleigh ................. H04L 47/803 709/224 |
| 8,689,328 | B2 | 4/2014 | Ormazabal et al. |
| 8,839,417 | B1 * | 9/2014 | Jordan ................ H04L 63/0227 726/22 |
| 9,055,093 | B2 * | 6/2015 | Borders ................ G06F 21/552 |
| 9,367,680 | B2 * | 6/2016 | Mahaffey ............ G06F 11/3013 |
| 9,557,889 | B2 * | 1/2017 | Raleigh ................. H04M 15/44 |
| 9,647,918 | B2 * | 5/2017 | Raleigh ............. H04W 28/0268 |
| 9,955,332 | B2 * | 4/2018 | Raleigh .................... H04W 4/50 |
| 10,015,676 | B2 * | 7/2018 | Alvarez Dominguez ................... H04W 12/128 |
| 10,063,654 | B2 | 8/2018 | Kirti et al. |
| 10,205,743 | B2 * | 2/2019 | Cp ...................... H04L 63/1408 |
| 10,218,697 | B2 * | 2/2019 | Cockerill ............ H04L 63/1433 |

(Continued)

*Primary Examiner* — Tauqir Hussain
(74) *Attorney, Agent, or Firm* — Polsinelli PC

(57) ABSTRACT

The present technology pertains to a system that routes application flows. The system can receive an application flow from a device by an active threat detection agent; analyze the application flow for user context, device context, and application context; classify the application flow based on the analysis of the application flow; and direct the application flow according to the classification of the application flow and an application access policy.

19 Claims, 5 Drawing Sheets

(56) References Cited

U.S. PATENT DOCUMENTS

| | | | |
|---|---|---|---|
| 2008/0109871 A1* | 5/2008 | Jacobs | H04L 63/20 726/1 |
| 2009/0327943 A1* | 12/2009 | Medvedev | G06F 21/577 726/25 |
| 2010/0185686 A1* | 7/2010 | Weigert | G06F 21/10 707/E17.044 |
| 2011/0191465 A1* | 8/2011 | Hofstaedter | G06F 15/173 709/224 |
| 2012/0023572 A1* | 1/2012 | Williams, Jr. | H04L 63/1425 726/13 |
| 2012/0102543 A1* | 4/2012 | Kohli | H04L 63/20 726/1 |
| 2016/0359740 A1* | 12/2016 | Parandehgheibi | H04W 84/18 |
| 2017/0126727 A1* | 5/2017 | Beam | H04L 63/20 |
| 2018/0048658 A1* | 2/2018 | Hittel | G06F 16/907 |
| 2018/0053181 A1* | 2/2018 | Noble | G06Q 20/3672 |
| 2018/0084010 A1* | 3/2018 | Joseph | H04L 63/108 |
| 2018/0159751 A1* | 6/2018 | Zhang | H04W 12/37 |
| 2018/0227223 A1* | 8/2018 | Hughes | H04L 69/22 |
| 2018/0288063 A1* | 10/2018 | Koottayi | H04L 67/22 |
| 2018/0316711 A1* | 11/2018 | Iyer | H04W 12/126 |
| 2018/0359244 A1* | 12/2018 | Cockerill | H04L 63/12 |
| 2018/0375886 A1 | 12/2018 | Kirti et al. | |
| 2019/0130113 A1* | 5/2019 | Obermeier | G06F 21/74 |
| 2019/0188389 A1* | 6/2019 | Peled | H04L 63/105 |
| 2020/0285761 A1* | 9/2020 | Buck | G06F 21/62 |

* cited by examiner

THREAT DETECTION OF APPLICATION TRAFFIC FLOWS

TECHNICAL FIELD

The present technology pertains to implementing granular access policies to application flows, and more specifically incorporating information about user context, device context, and application context in determining whether a flow is associated with any anomalies or risk and handling the flow according to application access policies based on the determinations.

BACKGROUND

Employees, contractors, consumers, and users today demand access to applications through more devices and more networks than ever before. For example, it is becoming common for personal devices to be used for work purposes, and for users to work from home. Even within the workplace users migrate across campuses. All of this variability leads to new considerations when it comes to application access. While conveniently-accessed application services provide great utility, proliferation of users and devices makes offering secure, nuanced access policies a challenge.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

The present technology pertains to a system, method, and instructions stored on a computer readable medium that route application flows based on a security and context analysis associate with the flow and an application policy for the destination application. The system can receive an application flow from a device by an active threat detection agent. The active threat detection agent can analyze the application flow for user context, device context, and application context and can classify the application flow based on the analysis of the application flow. The active threat detection agent can direct the application flow according to the classification of the application flow and an application access policy.

Example Embodiments

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The disclosed technology addresses the need in the art for granular decision making for application flow access policies. In some cases, as when a trusted user uses a trusted device to send an application flow, a monolithic access policy could be appropriate. However, technological proliferation has resulted in situations where untrusted users with trusted devices, trusted users with untrusted devices, and even untrusted users with untrusted devices need to send application flows to access pertinent data. Moreover, there exist situations in business and government where there is a need for appropriate access policies in all of these situations. As each user and device is different, granular access policies taking user context, device context, and the context of the application itself into account constitute a need in the art.

Figure 1:
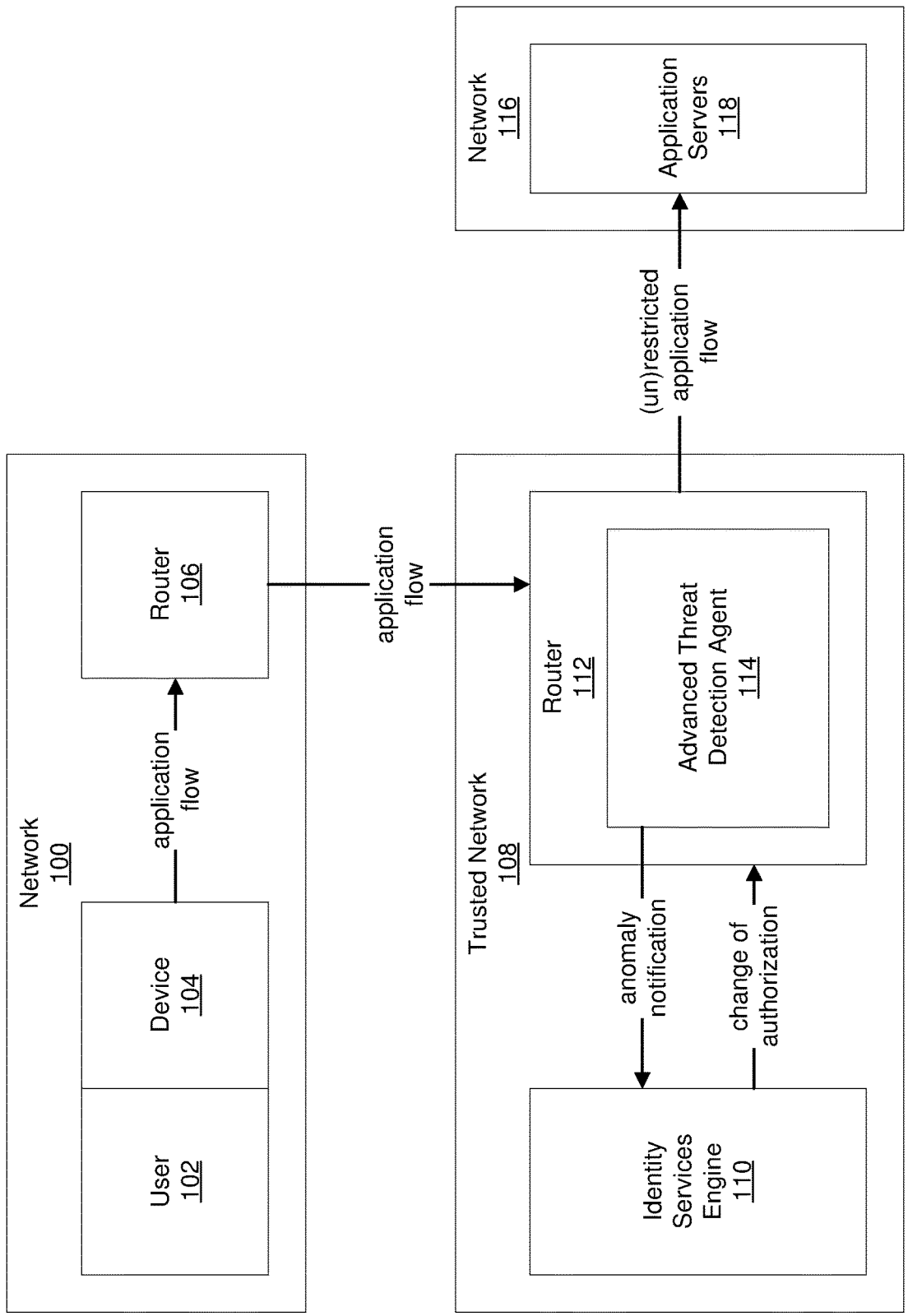
FIG. 1 illustrates an exemplary configuration of devices and a network in accordance with some aspects of the present technology.

FIG. 1 illustrates an example system in accordance with the present technology. User 102 requests data from Application Servers 118 through Device 104. User 102 may be trusted or untrusted, and Device 104 may be trusted or untrusted. The present technology incorporates relevant security information about User 102, Device 104, and the application whose data is hosted on Application Servers 118 to determine whether to fulfill, restrict, or deny User 102's request. The system in FIG. 1 shows an example system in which application access can occur, subject to application access policies.

A user can be considered a trusted user when the user provides sufficient access credentials or is in control of cryptographic access hardware, or demonstrates (inherent) possession of known biometrics such that the trusted user is verified and known to a system that controls enterprise network access. Usually a trusted user has an account with the enterprise that has sufficient privileges and can demonstrate necessary log in criteria to authenticate themselves and the user associated with the user account.

A user can be considered untrusted when either the user does not have an account with the enterprise, or the user is known to the enterprise, but does not have a sufficient access privileges to be considered trusted.

A device can be considered trusted when the device was issued by the enterprise, or when the device has software installed on it that puts it and the information stored on it under the control of the enterprise.

A device can be considered untrusted, when it does not meet the conditions noted above to be considered trusted. Sometimes an untrusted device can be what is known as a BYOD (bring your own device) such as occurs when a user brings their own mobile phone to work and the mobile phone connects to an enterprise network (trusted or untrusted network).

In Network 100, User 102 uses Device 104 to send an application flow via Router 106. Network 100 can be a trusted network or an untrusted network, and in some embodiments can be the same network as Trusted Network 108. The combination of User 102 and Device 104 can be trusted user/trusted device, untrusted user/trusted device, trusted user/untrusted device, or untrusted user/untrusted device.

A trusted network can be an enterprise network that exists behind a firewall, which segregates it from the rest of the Internet/other networks. The trusted enterprise network typically provides connection either directly or via a VPN or tunnel to core enterprise services. An untrusted network can also be an enterprise network, or third party network that is outside the firewall of the trusted network. In some embodiments, an enterprise might provide an untrusted network to provide Internet access to guests (untrusted users) or to employee devices (trusted users with untrusted devices).

In some embodiments, a trusted user/trusted device combination can be an employee accessing an enterprise application from a company-issued laptop. In some embodiments, an untrusted user/trusted device combination can be a library patron using a public computer to access a library search database. In some embodiments, a trusted user/untrusted device combination can be an email account holder accessing the email account on a new, unknown device. In some embodiments, an untrusted user/untrusted device combination can be a sporting event patron accessing a live stream of the game on a personal device.

Trusted Network 108 is an enterprise computer network which receives and routes the application flow. Router 112 is configured to receive the application flow, which can be processed by Active Threat Detection Agent 114 to determine whether an aspect of the flow might be anomalous.

Active Threat Detection Agent 114 can use one or more classifier models, such as random forests or isolation forests, to classify anomalous application flows. Random forests are an ensemble learning method that classify flows by constructing a multiple decision trees during training, applying each decision tree to the application flow, and outputting the classification that is the mode of the individual trees' classification outputs. Their use of many decision trees helps prevent overfitting the training data. Isolation forests are variants of random forests which randomly partition features of the dataset and assign anomaly scores to observations. They actively identify outliers as opposed to merely profiling normal data.

If the application flow is classified as anomalous by Active Threat Detection Agent 114, an anomaly notification is sent to Identity Services Engine 110.

Identity Services Engine 110 can determine an access policy for the application flow based on the user context, device context, application context, and the type of anomaly, among other considerations. Identity Services Engine 110 can send a change of authorization to Router 112, which applies appropriate restrictions to the application flow, either forwarding it as requested, forwarding it with restrictions, or rejecting it entirely.

As shown in FIG. 1, Active Threat Detection Agent 114 can reside on Router 112.

Identity Services Engine 110 is a policy engine for Trusted Network 108. It enables context-based access control across wired and wireless networks, and extends to mobile connectivity as well. It has network visibility to all devices connected to the network, and receives security information from at least two security services. For example, in some embodiments, it can receive security information from a network firewall and from trusted devices. It utilizes data from a range of services to provide optimal security policies. It contains models which allow for granular changes of authorization in response to factors such as user context, device context, time of day, location, access method, and application context based on existing application profiles and application access policies.

To make policy determinations for individual application flows, Identity Services Engine 110 applies policy sets which exist on Identity Services Engine 110. In some embodiments, these policy sets can be defined by an administrator or can be learned from application flow data. Policies determine the extent to which an application flow can access Application Servers 118 or, more broadly, Network 116. An unrestricted application flow will have full access to its requested data. A restricted application flow will have access to a portion, but not all, of its requested data. A denied application flow will not have access to any data in Application Servers 118, and User 102 can receive notice that the application flow was rejected. The implemented policy can be determined not only by the application flow's anomalous classification, but by factors such as user context, device context, time of day, location, access method, and application context.

Network 116 can be a computer network which hosts Application Servers 118. In some embodiments, it can be the same network as Network 100 or Trusted Network 108. In some embodiments, it can be a publicly hosted data center network. Upon receiving the restricted or unrestricted application flow, Application Servers 118 fulfill the application data request with hosted data. In some embodiments, it can be owned by the administrators of Trusted Network 108, the application service provider, or a third party.

Figure 2:
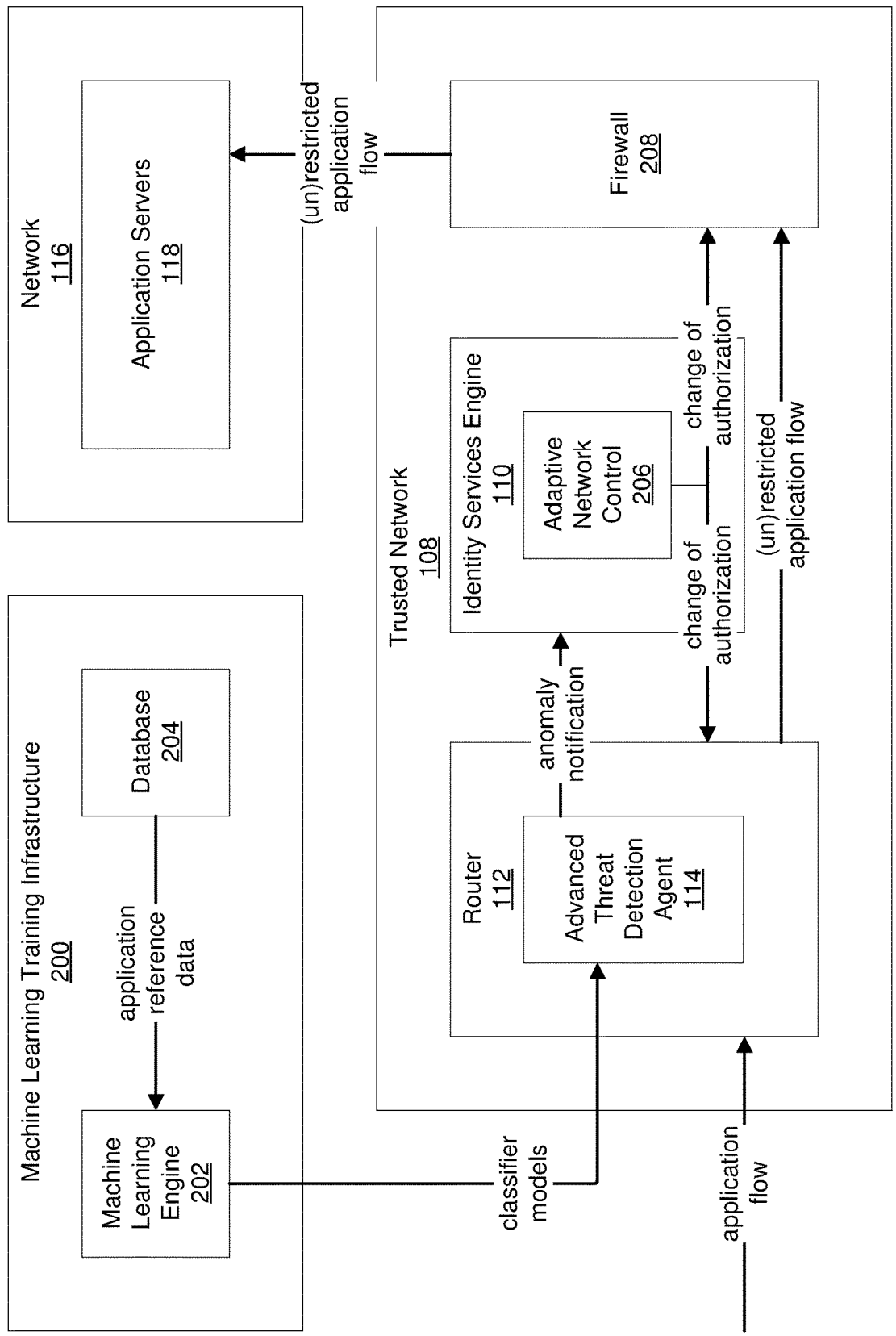
FIG. 2 illustrates an exemplary configuration of devices and a network in detail in accordance with some aspects of the present technology.

FIG. 2 illustrates the example system illustrated in FIG. 1 in greater detail. Active Threat Detection Agent 114 uses models developed by Machine Learning Engine 202 to classify application flows. Anomalous flows are handled by Identity Services Engine 110, which applies change of authorization policies to restrict the incoming application flow. These change of authorization policies take into account user context, device context, and application context.

Machine Learning Training Infrastructure 200 implements the generation of classifier models which detect anomalies in application flows. Database 204 stores reference data for the application subject to the application flow, and sends this data to Machine Learning Engine 202. Machine Learning Engine 202 uses the reference data as training data to generate classifier models to be used on application flows, which are sent to Advanced Threat Detection Agent 114. Machine Learning Training Infrastructure 200 updates Advanced Threat Detection Agent 114 offline. In some embodiments, Machine Learning Training Infrastructure 200 can be on the same site as Trusted Network 108; in others, it can be remote.

Machine Learning Engine 202 can generate random forest models, isolation forest models, or other models used to detect anomalies in application flows. In some embodiments, it can generate many models for use by Advanced Threat Detection Agent 114, and may generate models comprising many sub-models.

Database 204 can hold data for one or many applications. In some embodiments, this data can include information about users, devices, applications, and application flow behavior. It can be populated with data from the application requested by the application flow, with data from similar but distinct applications, or both. Database 204 can offer a full set of relevant data, or only a portion of the relevant data to Machine Learning Engine 202.

Adaptive Network Control 206 on Identity Services Engine 110 implements changes of authorization based on the access policy prescribed by Identity Services Engine 110. These changes of authorization are sent by Adaptive Network Control 206 to Router 112 and Firewall 208, which implement the changes to the current application flow and future application flows. Changes of authorization can be implemented continuously as new information, such as current application flow behavior, becomes available.

Figure 3:
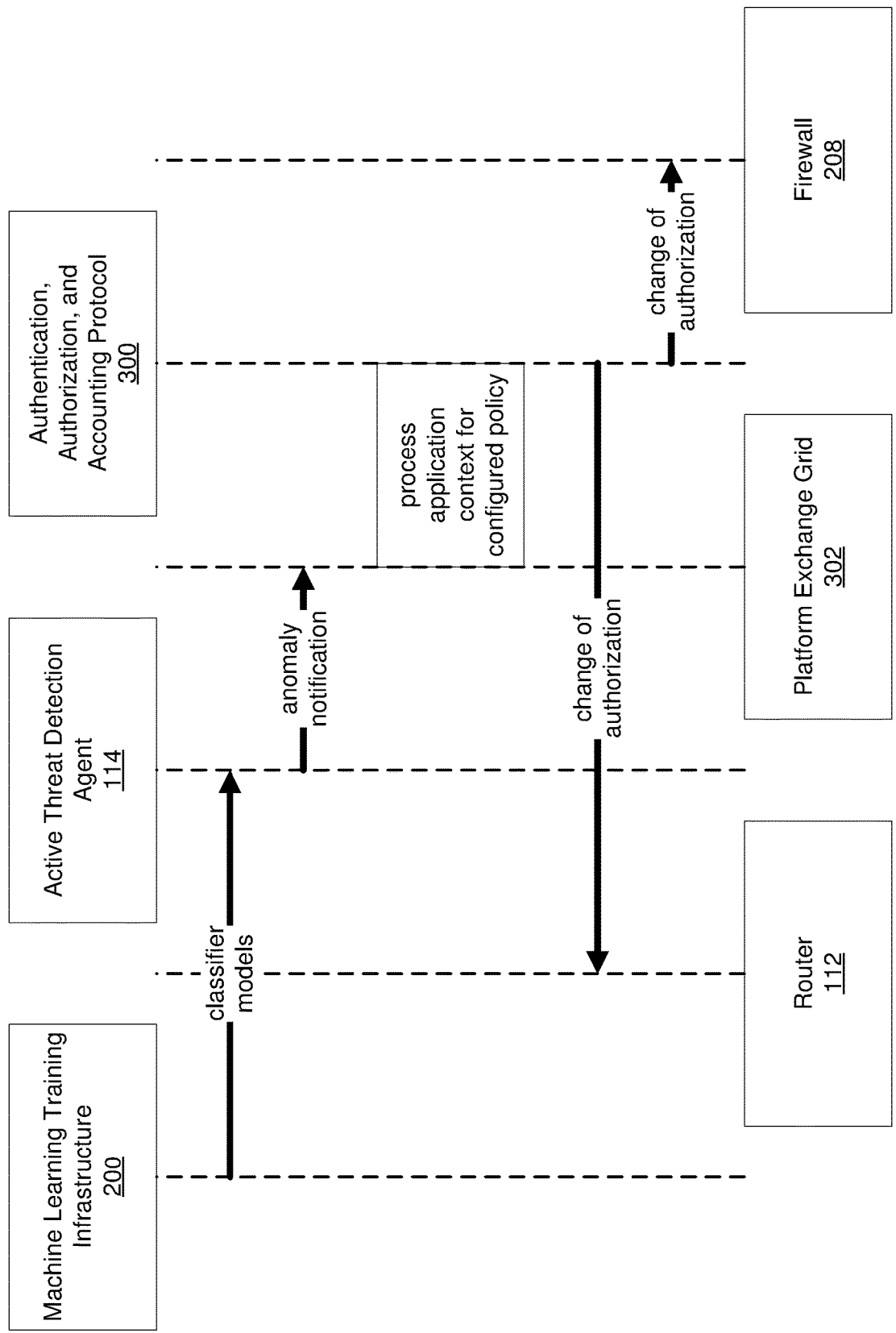
FIG. 3 illustrates a high level workflow in the exemplary configuration of devices and a network in accordance with some aspects of the present technology.

FIG. 3 illustrates a high level workflow consistent with some embodiments of the present technology.

Upon generating classifier models for application flows, Machine Learning Training Infrastructure 200 sends these models to Active Threat Detection Agent 114. When an application flow is classified as anomalous, Active Threat Detection Agent 114 sends an anomaly notification to Platform Exchange Grid 302.

Authentication, Authorization, and Accounting Protocol 300 and Platform Exchange Grid 302 work in tandem to process the application context with the application access profile in order to configure an application access policy. These are two example security information services which could comprise Identity Services Engine 110.

Authentication, Authorization, and Accounting Protocol 300 performs three primary services: it authenticates the user context of the application flow, authorizes the extent to which the application flow can access the application, and accounts for resources used during the application access. It exists as part of Identity Services Engine 110.

Platform Exchange Grid 302 automatically shares and consolidates data from various security services. Security analytics, searches, and policies can be implemented in a centralized location and applied to all security services. It exists as a part of Identity Services Engine 110.

Once an application access policy has been formulated for the anomalous application flow by Authentication, Authorization, and Accounting Protocol 300 and Platform Exchange Grid 302, Authentication, Authorization, and Accounting Protocol 300 sends a change of authorization policy to Router 112 and Firewall 208. This change of authorization policy restricts the application flow in some way. In some embodiments, it can proceed to deny the application flow entirely. In some embodiments, it can allow the application flow to proceed uninhibited but with a higher sensitivity for anomalous behavior during the current session. In some embodiments, it can allow a portion of the application flow to be fulfilled, but not the entirety of it.

Figure 4:
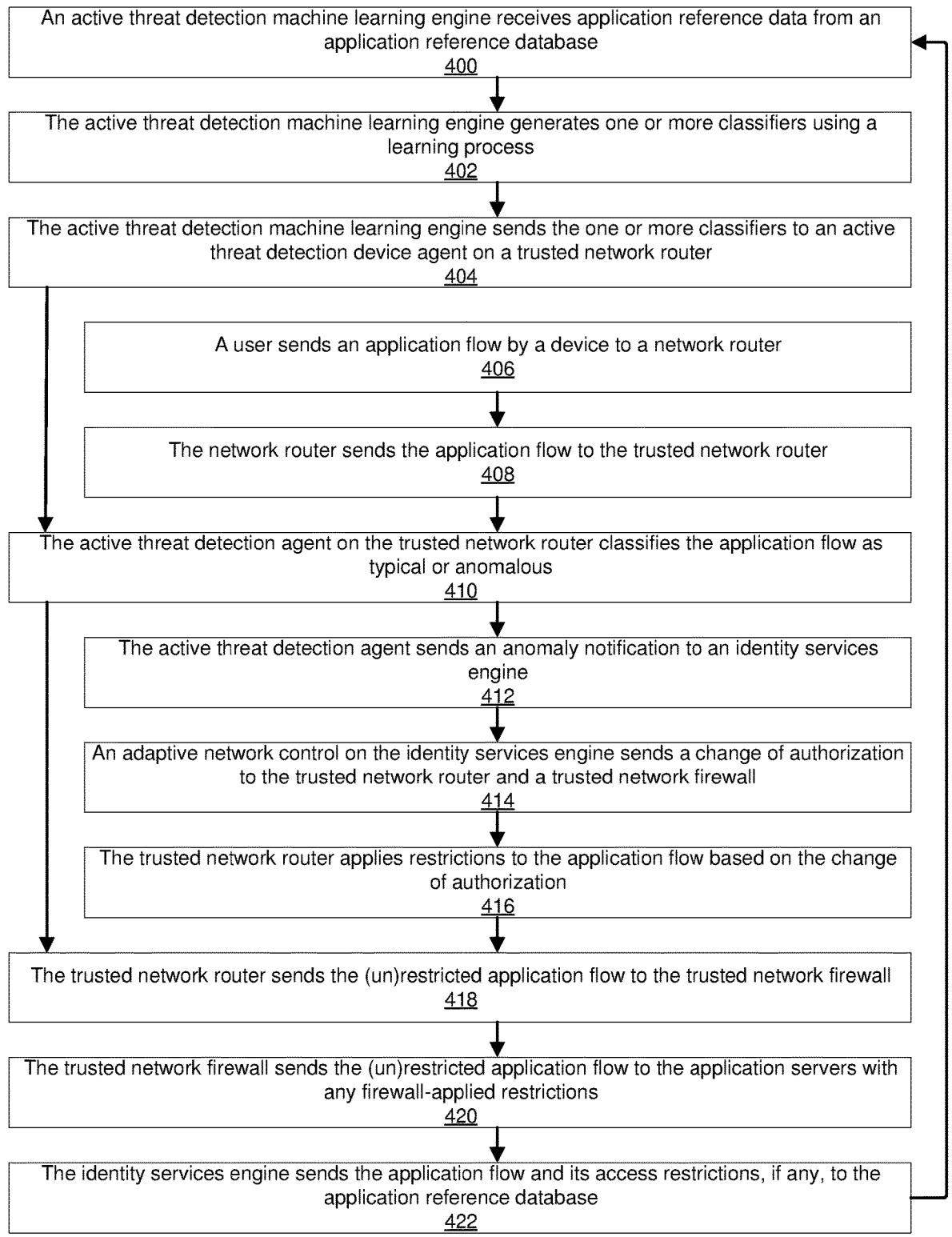
FIG. 4 illustrates an example method embodiment in accordance with some aspects of the present technology.

FIG. 4 illustrates an example method in accordance with some embodiments of the present technology, and can be carried out by the system described in FIGS. 1 and 2. However, nothing in FIG. 4 should be considered limiting of the system illustrated in FIG. 1 or FIG. 2, and likewise, the system illustrated in FIG. 1 or FIG. 2 should not be interpreted to limit the method of FIG. 4. Any limitation of the depicted system or method will be recited in the appended claims.

The method begins when Machine Learning Engine 202 receives (400) application reference data from Database 204. In some embodiments, the application reference data can include historical data describing application flows destined for the application. In some embodiments, the application reference data can include data from other, related applications. For example, application flows for a new instant messaging service may be classified using reference data from older instant messaging services or emails, especially if there is no reference data for the pursuant application. In some embodiments, the application flows described in the application reference data can include labels indicating if the flow includes an anomaly.

Upon receiving the application reference data, Machine Learning Engine 202 can generate (402) one or more trained classifiers using a learning process. These classifiers can be random forests, isolation forests, or any other models used for identifying anomalous application flows relative to the application reference data. Once generated, these classifiers are sent (404) on to Active Threat Detection Agent 114 for use on incoming application flows.

In some embodiments, the generated classifiers can use multiple sub-models working in tandem to identify anomalous application flows. For example, Active Threat Detection Agent 114 could use, in parallel, a clustering algorithm like k-means and a supervised learning model like random forests to identify outliers, and then compare the results of the two processes to identify outliers.

When User 102 sends (406) an application flow via Device 104 to Application Servers 118, the application flow passes through Router 108 to Router 112 (408), where it is analyzed by Active Threat Detection Agent 114 which classifies (410) the application flow as typical or anomalous.

Application flows classified as typical are allowed to proceed through Router 112 to Firewall 208 (418) and from there to Application Servers 118 without any additional restrictions to the application flow (420) (subject to any other restrictions provided by an application access policy). At this point, typical, unrestricted application flows are fulfilled by Application Servers 118. In some embodiments, depending on the application access policy, this will be true if and only if User 102 is a trusted user and Device 104 is a trusted device. For example, secure applications like mobile banking services may require this combination to be in place for unrestricted application access. In some embodiments, access policies will allow trusted user/untrusted device, untrusted user/trusted device, or untrusted user/untrusted device combinations to access Application Servers 118 without restrictions. For example, airline entertainment applications may allow all users and devices on an aircraft to have unrestricted application access provided that no other anomaly is detected in the application flow.

Information regarding application flows classified as anomalous is sent (412) to Identity Services Engine 110 as an anomaly notification, at which point Adaptive Network Control 206 decrees a policy which requires a change of authorization to be applied (414) to Router 112 and Firewall 208. Restrictions in accordance with the policy are applied (416) to the application flow at Router 112 and Firewall 208. Router 112 can send the application flow (418) to Firewall 208 in accordance with the applied (416) application policy. Similarly Firewall 208 can send the application flow (420) to Application Servers 118 in accordance with the applied (416) application policy.

Application flows classified as anomalous can be classified as such for different reasons depending on the application flow and its context. Anomalous classification can be based, in part, on the combination of user and device context: trusted user/untrusted device, untrusted user/trusted device, or untrusted user/untrusted device. For example, secure applications may not be visible to anyone but trusted users with trusted devices, and thus application flows coming from other combinations can automatically be considered anomalous. Anomalous classification can be based, in part, on user session history or behavior, such as an abnormal volume of requests from the same user session. Anomalous classification can be based, in part, on abnormal population of data fields; for example, a random string of characters populating a user identification field may be anomalous even in applications where some untrusted users can be allowed access.

In some embodiments, application access policies can vary with the application pursuant to the application flow. For example, a mobile payments application from a provider may require a trusted user with a trusted device for access, while a messaging service from the same provider may require a trusted user but be indifferent to device context.

In some embodiments, changes of authorization can be sent continuously by Adaptive Network Control 206 as needed. For example, if the classifiers on Active Threat Detection Agent 114 are updated during an application session, the existing application flow's access policy could be modified by the new classifiers. Or, for example, the behavior during the application session could be anomalous even though the original application flow was classified as typical, necessitating a change of authorization.

At any point after a flow is classified and an access policy is determined, Identity Services Engine 110 can send the application flow with its access policy to Database 204 (422). In some embodiments, this data can serve as application reference data for the pursuant application or for other, related applications.

Figure 5:
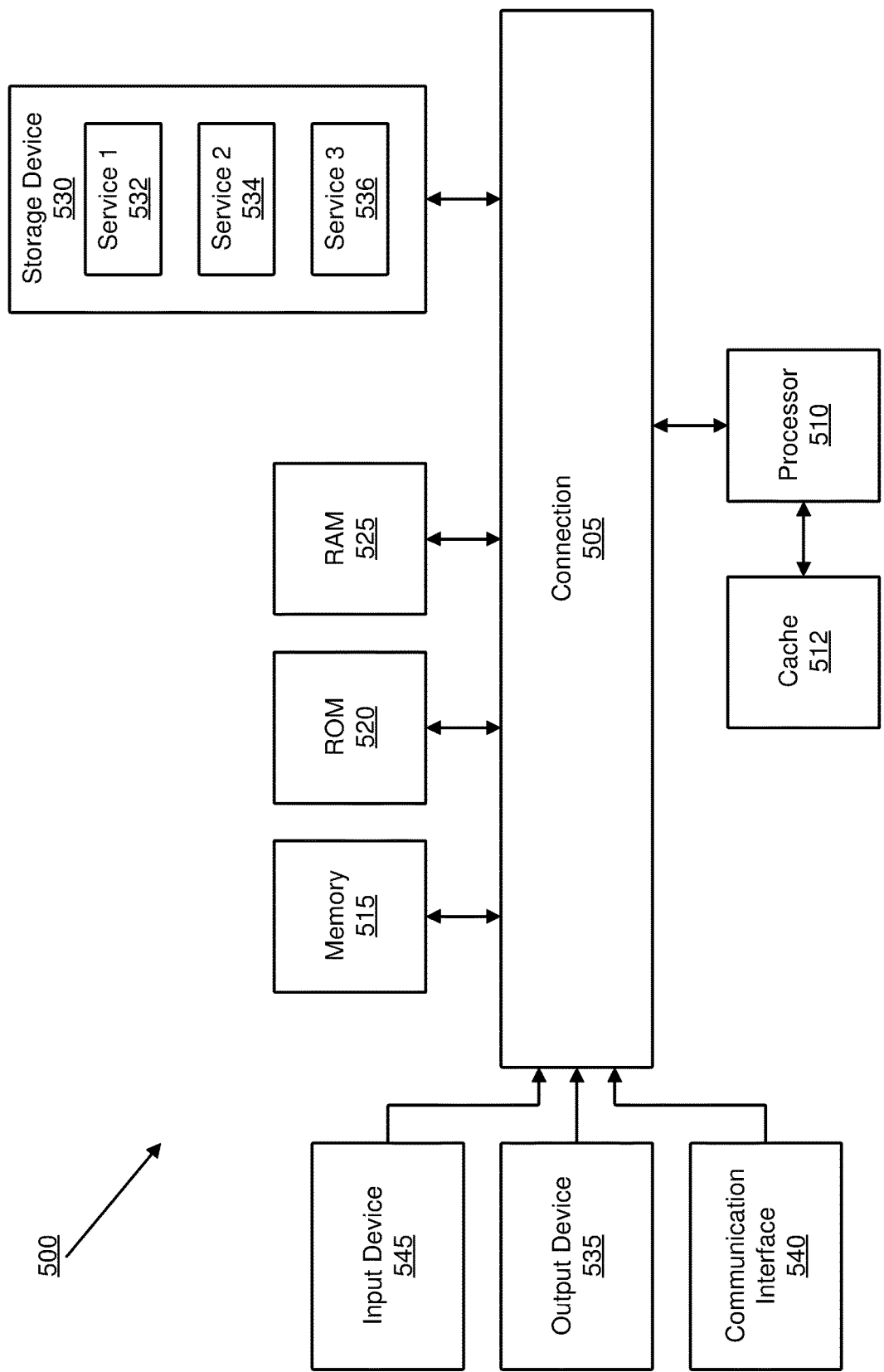
FIG. 5 illustrates a network interface in accordance with some aspects of the present technology.

FIG. 5 shows an example of computing system 500, which can be for example any computing device making up trusted network 108, router 112, identity services engine 110, or any other computing device referenced herein, or any component thereof in which the components of the system are in communication with each other using connection 505. Connection 505 can be a physical connection via a bus, or a direct connection into processor 510, such as in a chipset architecture. Connection 505 can also be a virtual connection, networked connection, or logical connection.

In some embodiments computing system 500 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example system 500 includes at least one processing unit (CPU or processor) 510 and connection 505 that couples various system components including system memory 515, such as read only memory (ROM) 520 and random access memory (RAM) 525 to processor 510. Computing system 500 can include a cache of high-speed memory 512 connected directly with, in close proximity to, or integrated as part of processor 510.

Processor 510 can include any general purpose processor and a hardware service or software service, such as services 532, 534, and 536 stored in storage device 530, configured to control processor 510 as well as a special-purpose processor where software instructions are incorporated into the actual processor design. Processor 510 may essentially be a completely self-contained computing system, containing multiple cores or processors, a bus, memory controller, cache, etc. A multi-core processor may be symmetric or asymmetric.

To enable user interaction, computing system 500 includes an input device 545, which can represent any number of input mechanisms, such as a microphone for speech, a touch-sensitive screen for gesture or graphical input, keyboard, mouse, motion input, speech, etc. Computing system 500 can also include output device 535, which can be one or more of a number of output mechanisms known to those of skill in the art. In some instances, multimodal systems can enable a user to provide multiple types of input/output to communicate with computing system 500. Computing system 500 can include communications interface 540, which can generally govern and manage the user input and system output. There is no restriction on operating on any particular hardware arrangement and therefore the basic features here may easily be substituted for improved hardware or firmware arrangements as they are developed.

Storage device 530 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 530 can include software services, servers, services, etc., that when the code that defines such software is executed by the processor 510, it causes the system to perform a function. In some embodiments, a hardware service that performs a particular function can include the software component stored in a computer-readable medium in connection with the necessary hardware components, such as processor 510, connection 505, output device 535, etc., to carry out the function.

The present technology generates machine learning models which are then used to classify application flows as typical or anomalous. Anomalous flows, identified in part by user context, device context, and application context, are referred to a policy engine on a trusted network. This policy engine then determines what application access policy is appropriate for this application flow. Determining application policies on a case-by-case basis allows for high levels of granularity and allows for trusted users with trusted devices, untrusted users with trusted devices, trusted users with untrusted devices, and untrusted users with untrusted devices to be subject to appropriate policies.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

The invention claimed is:

1. A non-transitory computer readable medium comprising instructions that when executed cause at least one processor to:
receive traffic flow of an application through a network from a device by an active threat detection agent, wherein the active threat detection agent is executing on a network device on a route of the traffic flow from the device to a destination in the network; analyze the traffic flow for at least, device context including at least a security assessment of the device;
determine whether to classify the traffic flow, based on the analysis of the traffic flow, as anomalous; and
in response to the traffic flow being classified as anomalous, restricting the traffic flow to the destination according to the classification of the traffic flow and an application access policy by a change of authorization on the network device, wherein the application access policy includes at least one restriction for the traffic flow.

2. The non-transitory computer readable medium of claim 1, wherein the security assessment being is based in part on whether the device is an enterprise issued device, what type of network the device is connected to, where the device is located, and a user account associated with the device.

3. The non-transitory computer readable medium of claim 1, wherein the traffic flow is analyzed according to an application context, wherein the application context pertains to where the application is located in the network, and the access profile for the application.

4. The non-transitory computer readable medium of claim 1, wherein the access policy takes into account whether a user account has access privileges to access the application that is a destination of the access flow, and whether the device context are sufficient to access the application.

5. The non-transitory computer readable medium of claim 1, wherein the instructions to restrict the traffic flow according to the classification of the traffic flow and the application access policy include instructions to provide the change of authorization to discontinue authorization to access the application after a session with the application has already been initiated.

6. The non-transitory computer readable medium of claim 1, wherein the instructions to classify the traffic flow include instructions to use a machine learning classifier to classify the traffic flow.

7. The non-transitory computer readable medium of claim 6, wherein the machine learning classifier is at least one of a random forest classifier or an isolation forest classifier.

8. The non-transitory computer readable medium of claim 1, wherein the device context includes an untrusted device on an untrusted network, and the classification of the traffic flow is a trusted traffic flow.

9. The non-transitory computer readable medium of claim 1, wherein the device context includes an untrusted device on a trusted network.

10. The non-transitory computer readable medium of claim 1, wherein the device context includes a trusted device on an untrusted network.

11. The non-transitory computer readable medium of claim 9, wherein the device context includes an untrusted user.

12. A system comprising:
an identity service configured to analyze a traffic flow of an application through a network for device context including at least a security assessment of the device;
a threat detection agent configured to receive the traffic flow, and to classify the traffic flow based on the analysis of the traffic flow by the identify service, and in response to the traffic flow being classified as anomalous, the identify services is configured to restrict the traffic flow to a destination in the network according to the classification of the traffic flow and an application access policy by a change of authorization on the network device, wherein the application access policy includes at least one restriction for the traffic flow, and wherein the active threat detection agent is executing on a network device on a route of the traffic flow from the device to the destination.

13. The system of claim 12, wherein the identity service is configured to provide the change of authorization to discontinue authorization to access the application after a session with the application has already been initiated.

14. A method comprising:
receiving an traffic flow of an application through a network from a device by an active threat detection agent, wherein the active threat detection agent is executing on a network device on a route of the traffic flow from the device to a destination in the network;
analyzing the traffic flow for device context including at least a security assessment of the device;
determining whether to classifying the traffic flow based on the analysis of the traffic flow, as anomalous; and
in response to the traffic flow being classified as anomalous, restricting the traffic flow to the destination according to the classification of the traffic flow and an application access policy by a change of authorization on the network device, wherein the application access policy includes at least one restriction for the traffic flow.

15. The method of claim 14, wherein the security assessment being is based in part on whether the device is an enterprise issued device, what type of network the device is connected to, where the device is located, and a user account associated with the device.

16. The method of claim 14, wherein the instructions to restrict the traffic flow according to the classification of the traffic flow and the application access policy include instructions to provide the change of authorization to discontinue authorization to access the application after a session with the application has already been initiated.

17. The non-transitory computer readable medium of claim 1, wherein the traffic flow is analyzed for at least a user context or application context.

18. The system of claim 12, wherein the traffic flow is analyzed for at least a user context or application context.

19. The method of claim 14, wherein the traffic flow is analyzed for at least a user context or application context.

* * * * *